(12) United States Patent
Hirai et al.

(10) Patent No.: US 8,469,316 B2
(45) Date of Patent: Jun. 25, 2013

(54) HIGH-LIFT DEVICE, WING, AND NOISE REDUCTION STRUCTURE FOR HIGH-LIFT DEVICE

(75) Inventors: Makoto Hirai, Nagoya (JP); Ichiro Maeda, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 747 days.

(21) Appl. No.: 12/526,800

(22) PCT Filed: May 20, 2008

(86) PCT No.: PCT/JP2008/059215
§ 371 (c)(1),
(2), (4) Date: Aug. 12, 2009

(87) PCT Pub. No.: WO2008/146656
PCT Pub. Date: Dec. 4, 2008

(65) Prior Publication Data
US 2010/0084508 A1     Apr. 8, 2010

(30) Foreign Application Priority Data

May 25, 2007   (JP) ................................. 2007-139430
Feb. 27, 2008   (JP) ................................. 2008-046905

(51) Int. Cl.
*B64C 9/24*         (2006.01)

(52) U.S. Cl.
USPC ............................ 244/214; 244/1 N; 244/210

(58) Field of Classification Search
USPC ........................... 244/1 N, 198, 210, 213–217
IPC ......................................................... B64C 9/24
See application file for complete search history.

(56) References Cited

U.S. PATENT DOCUMENTS

| | | | |
|---|---|---|---|
| 2,541,565 | A | 2/1951 | Ziegler |
| 3,273,826 | A | 9/1966 | Jackson |

(Continued)

FOREIGN PATENT DOCUMENTS

| | | |
|---|---|---|
| CA | 2 590 525 | 6/2006 |
| GB | 360976 | 11/1931 |

(Continued)

OTHER PUBLICATIONS

International Search Report issued Jul. 1, 2008 in International (PCT) Application No. PCT/JP2008/059215, filed May 20, 2008.

(Continued)

*Primary Examiner* — Tien Dinh
*Assistant Examiner* — Michael Kreiner
(74) *Attorney, Agent, or Firm* — Wenderoth, Lind & Ponack, L.L.P.

(57) ABSTRACT

A high-lift device suppresses the occurrence of aerodynamic noise while minimizing an increase in airframe weight. The device includes a slat main body disposed to be able to extend from and retract into a main wing, and a concave part formed on the slat main body at a location facing the main wing and able to accommodate at least a part of a leading edge of the main wing. The device also includes an airflow control part disposed at an area in the concave part facing an upper surface of the main wing, that is accommodated between the main wing and the concave part when the slat main body is refracted into the main wing, and that suppresses turbulence colliding against the area in the concave part facing the upper surface of the main wing when the slat main body is extended from the main wing.

11 Claims, 12 Drawing Sheets

U.S. PATENT DOCUMENTS

| | | | | |
|---|---|---|---|---|
| 4,702,441 | A * | 10/1987 | Wang | 244/204 |
| 4,753,402 | A | 6/1988 | Cole | |
| 5,088,665 | A * | 2/1992 | Vijgen et al. | 244/200 |
| 5,992,792 | A * | 11/1999 | Arnason | 244/13 |
| 6,394,396 | B2 | 5/2002 | Gleine et al. | |
| 6,457,680 | B1 | 10/2002 | Dobrzynski et al. | |
| 7,065,957 | B2 | 6/2006 | Balzer | |
| 7,322,547 | B2 * | 1/2008 | Konings | 244/214 |
| 7,611,099 | B2 * | 11/2009 | Kordel et al. | 244/215 |
| 7,766,281 | B2 * | 8/2010 | Lorkowski et al. | 244/215 |
| 2001/0038058 | A1 | 11/2001 | Gleine et al. | |
| 2003/0226936 | A1 | 12/2003 | Mau et al. | |

FOREIGN PATENT DOCUMENTS

| | | |
|---|---|---|
| WO | 2006/056160 | 6/2006 |
| WO | 2008/141618 | 11/2008 |

OTHER PUBLICATIONS

Canadian Office Action issued Aug. 29, 2011 in corresponding Canadian Patent Application No. 2,678,164.

European Search Report issued Oct. 5, 2012 in corresponding European Patent Application No. 12178247.8.

Supplementary European Search Report issued Sep. 27, 2012 in corresponding European Application No. 08764375.5.

* cited by examiner

HIGH-LIFT DEVICE, WING, AND NOISE REDUCTION STRUCTURE FOR HIGH-LIFT DEVICE

TECHNICAL FIELD

The present invention relates to high-lift devices, wings, and noise reduction structures for high-lift devices that are suitable, for example, for suppressing the occurrence of aerodynamic noise.

BACKGROUND ART

Noise generated by aircraft at the time of takeoff and landing is a large problem for the environment around airports. This noise includes engine noise and aerodynamic noise generated from high-lift devices (such as, slats and flaps), the undercarriage, etc.

Since the high-lift devices, which are one of the sources of the above-mentioned noise, are used to obtain aerodynamic characteristics required at the time of takeoff and landing of the aircraft, they are designed with an emphasis on their aerodynamic characteristics, whereas noise reduction is not taken into consideration.

However, since the noise is a large problem as described above, efforts have been made to reduce the noise of the high-lift devices as well. For example, technologies for achieving a reduction in noise generated at slats serving as the high-lift devices have been proposed (for example, see U.S. Pat. No. 6,394,396.

U.S. Pat. No. 6,394,396 describes a technology in which a balloon that can be inflated and deflated is disposed on a concave part of a slat facing a main wing.

With this technology, when the slat is extended (separated) from the main wing, the balloon is inflated to fill the concave part, thus suppressing the occurrence of aerodynamic noise due to turbulence caused by the concave part.

The concave part is provided to ensure space for avoiding interference with the leading edge of the main wing when the slat is retracted into (is brought into contact with) the main wing.

SUMMARY OF THE INVENTION

However, with the technology described in U.S. Pat. No. 6,394,396, in addition to a mechanism that makes the slat extend from and retract into the main wing, a mechanism that inflates and deflates the balloon needs to be disposed inside the main wing or the like. There is less extra space inside the main wing or the like, leading to a structural (spatial) problem in disposing the mechanism.

In particular, in order to inflate the balloon, high-pressure air needs to be supplied to the balloon. In order to supply the high-pressure air, it is necessary to provide a special compressor or to provide pipes, etc. for guiding the high-pressure air from the engines. There is a structural (spatial) problem in disposing such a mechanism.

Further, there is a problem in that the airframe weight of the aircraft is increased when such a mechanism is added.

The present invention has been made to solve the above-mentioned problems, and an object thereof is to provide high-lift devices, wings, and noise reduction structures for high-lift devices capable of suppressing the occurrence of aerodynamic noise while restricting an increase in airframe weight.

In order to achieve the above-described object, the present invention provides the following solutions.

A first aspect of the present invention relates to a high-lift device including a slat main body that is disposed so as to be able to extend from and retract into a main wing; a concave part that is formed on the slat main body at a location that faces the main wing, so as to be able to accommodate at least a part of a leading edge of the main wing; and an airflow control part that is disposed at an area in the concave part facing an upper surface of the main wing, that is accommodated between the main wing and the concave part when the slat main body is retracted into the main wing, and that suppresses the turbulence colliding against the area in the concave part facing the upper surface of the main wing when the slat main body is extended from the main wing.

According to the first aspect of the present invention, when the slat main body is retracted into the main wing, the concave part accommodates the leading edge of the main wing. At this time, the airflow control part is accommodated between the main wing and the concave part. Thus, the leading edge of the main wing can be formed in a shape that does not impair the aerodynamic characteristics, without considering interference with the airflow control part.

Not impairing the aerodynamic characteristics means that, for example, the aerodynamic lift characteristics are not impaired in the state where the slat main body is extended from or retracted into the main wing.

Specifically, in the state where the slat main body is retracted into the main wing, the airflow control part is accommodated between the main wing and the concave part. Thus, turbulence around the main wing and the slat main body is not caused, and the aerodynamic lift characteristics, etc. are not impaired. On the other hand, in the state where the slat main body is extended from the main wing, turbulence between the slat main body and the main wing is not caused by the airflow control part, and the aerodynamic lift characteristics, etc. are not impaired.

When the slat main body is extended from the main wing, part of the air flows along the lower surface of the slat main body and is separated from the lower surface. The separated air (shear layer) flows between the slat main body and the main wing, collides against the airflow control part, and flows along the airflow control part and the surface of the concave part.

The airflow control part can suppress the turbulence colliding against the area in the concave part facing the upper surface of the main wing, in other words, against the airflow control part. Therefore, compared with a case where the airflow control part is not provided, it is possible to suppress the occurrence of aerodynamic noise caused by turbulence.

Further, compared with the technology described in U.S. Pat. No. 6,394,396, a smaller number of components is required, restricting an increase in weight.

In the first aspect of the invention, it is desirable to have a structure in which the airflow control part includes an inclined plate that is provided at the area in the concave part facing the upper surface of the main wing and whose angle with respect to the central axis of the slat main body can be deflected.

Accordingly, the angle of the inclined plate can be deflected at an angle for avoiding interference with the upper surface of the main wing. Thus, the leading edge of the wing can be formed in a shape that does not impair the aerodynamic characteristics, without considering interference with the inclined plate.

When the slat main body is extended from the main wing, an air (shear layer) separated from the lower surface of the slat main body flows between the slat main body and the main wing, collides against the inclined plate, and flows along the inclined plate and the surface of the concave part.

Since the angle of the inclined plate with respect to the above-mentioned central axis can be deflected, the collision angle of the shear layer and the inclined plate can be deflected. Therefore, compared with a case where the collision angle cannot be deflected, it is possible to suppress the occurrence of aerodynamic noise by selecting a collision angle at which less aerodynamic noise occurs.

In the above-described structure, it is desirable that one end of the inclined plate that is close to the main wing is pivotably supported on the slat main body; and the other end of the inclined plate is positioned at a location where interference with the leading edge of the main wing does not occur and aerodynamic characteristics are not impaired, in a state where the slat main body is retracted into the main wing, and moves downward with respect to the central axis when the slat main body is extended from the main wing.

Accordingly, when the slat main body is retracted into the main wing, the other end of the inclined plate pivots toward a location where interference with the leading edge of the main wing does not occur and the aerodynamic characteristics are not impaired, in other words, it pivots upward about the one end (that is, in a direction in which it moves away from the central axis). Therefore, it is possible to avoid interference by widening a gap between the inclined plate and the upper surface of the main wing.

When the slat main body is extended from the main wing, the other end of the inclined plate pivots about the one end downward with respect to the central axis (that is, in a direction in which it approaches the central axis). Therefore, the collision angle of the shear layer and the inclined plate can be reduced.

In the above-described structure, it is desirable to further include a seal part that extends in a direction in which the slat main body extends and that is brought into contact with the area in the concave part facing the upper surface of the main wing and is deformed when the slat main body is retracted into the main wing, in which: one end of the inclined plate that is close to the main wing is pivotably supported on the slat main body; and the other end of the inclined plate is supported on the seal part.

Accordingly, when the slat main body is retracted into the main wing, the seal part is brought into contact with the upper surface of the main wing. Therefore, a gap between the slat main body and the main wing is sealed, thus preventing water, dust, etc. from entering the concave part.

Further, since the seal part is brought into contact with the upper surface of the main wing and is deformed, the other end of the inclined plate is deformed toward a location where interference with the leading edge of the main wing does not occur and the aerodynamic characteristics are not impaired. In other words, the other end of the inclined plate is deformed upward about the one end (that is, in a direction in which it moves away from the central axis). Therefore, the airflow control part is accommodated in the gap between the slat main body and the upper surface of the main wing without interference.

On the other hand, when the slat main body is extended from the main wing, the shape of the seal part that was in contact with and pressed by the upper surface of the main wing is restored. Accordingly, the shape of the inclined plate that was deformed upward with respect to the central axis about the one end is also restored at the other end of the inclined plate. Therefore, the collision angle of the above-mentioned shear layer and the inclined plate can be reduced.

In the above-described structure, it is desirable that the inclined plate is made of a material that has elasticity.

If the seal part, etc. are made of an elastic material, for example, the inclined plate is also made of the elastic material, thereby allowing the inclined plate and the seal part, etc. to be integrally formed.

In the first aspect of the invention, it is desirable that the airflow control part includes a shock absorbing part that absorbs part of energy made by air flowing toward the area facing the upper surface of the main wing.

Accordingly, when the slat main body is extended from the main wing, an air (shear layer) separated from the lower surface of the slat main body flows between the slat main body and the main wing, collides against the shock absorbing part, and flows along the shock absorbing part and the surface of the concave part.

When the separated air collides against the shock absorbing part, the shock absorbing part absorbs part of the energy of the airflow. Therefore, it is possible to reduce the aerodynamic noise generated by the airflow after it collides against the shock absorbing part.

In the first aspect of the invention, it is desirable to further include a lower-surface plate that is a plate-like member extending toward the main wing from an edge line at which the lower surface of the slat main body and the concave part meet, and whose angle with respect to the central axis can be deflected.

Accordingly, when the slat main body is retracted into the main wing, the concave part accommodates the leading edge of the main wing. At this time, since the angle of the lower-surface plate with respect to the central axis can be deflected, the angle of the lower-surface plate with respect to the central axis is deflected at an angle for smoothly connecting the lower surface of the slat main body to the lower surface of the main wing. Thus, deterioration in the aerodynamic characteristics of the wing, having the slat main body and the main wing, can be prevented.

When the slat main body is extended from the main wing, part of the air flows along the lower surface of the slat main body and the lower-surface plate and is separated from the lower-surface plate. Since the angle of the lower-surface plate with respect to the central axis can be deflected, the direction of the separated air can be deflected. Thus, compared with a case where the airflow is separated from the lower-surface plate positioned in the same state as when the slat main body is retracted into the main wing, the direction of the separated air can be deflected to weaken the shear layer, thereby suppressing the occurrence of aerodynamic noise.

On the other hand, the separated air flows between the slat main body and the main wing, collides against the inclined plate, and flows along the inclined plate and the surface of the concave part.

Since the angle of the lower-surface plate with respect to the central axis can be deflected, it is possible to deflect the direction of the separated air to deflect the collision angle of the separated air with respect to the inclined plate. Therefore, compared with a case where the direction of the separated air cannot be deflected, it is possible to suppress the occurrence of aerodynamic noise by selecting a collision angle at which less aerodynamic noise occurs.

In the first aspect of the invention, it is desirable that a lower-surface plate that is a plate-like member extending toward the main wing from an edge line at which the lower surface of the slat main body and the concave part meet, and whose angle with respect to the central axis can be deflected is further included; the lower-surface plate is pivotably supported at the edge line on the slat main body; and the other end of the lower-surface plate is positioned at a location where interference with the leading edge of the main wing does not occur and aerodynamic characteristics are not impaired, in a state where the slat main body is retracted into the main wing, and moves upward or downward with respect to the central axis when the slat main body is extended from the main wing.

Accordingly, when the slat main body is retracted into the main wing, the end of the lower-surface plate that is close to the main wing pivots toward a location where interference with the leading edge of the main wing does not occur and the aerodynamic characteristics are not impaired, in other words, it pivots downward (that is, in a direction in which it moves away from the central axis). Therefore, interference between the lower-surface plate and the leading edge of the main wing is avoided. Further, the lower-surface plate can smoothly connect the lower surface of the slat main body to the lower surface of the main wing.

When the slat main body is extended from the main wing, the end of the lower-surface plate that is close to the main wing pivots upward with respect to the central axis (that is, in a direction in which it approaches the central axis). Therefore, the direction of the separated air is deflected to reduce the collision angle of the separated air with respect to the inclined plate, thereby allowing suppression of the occurrence of aerodynamic noise.

On the other hand, even when the end of the lower-surface plate that is close to the main wing pivots downward with respect to the central axis (in other words, in a direction in which it moves away from the central axis), if a porous plate or serrations are used for the lower-surface plate, for example, the shear layer of the separated air is weakened to allow a reduction in aerodynamic noise.

In the first aspect of the invention, it is desirable that a lower-surface plate that is a plate-like member extending toward the main wing from an edge line at which the lower surface of the slat main body and the concave part meet, and whose angle with respect to the central axis can be deflected is further included; and the lower-surface plate is made of one of a member through which an air does not pass, a member through which part of the air passes, a member having serrations at the end thereof close to the main wing, or a combination thereof.

Accordingly, when a member through which part of the air passes is used for the lower-surface plate, the shear layer of the separated air is weakened to allow a reduction in aerodynamic noise.

When serrations are provided at the end of the lower-surface plate that is close to the main wing, the shear layer of the separated air is weakened to allow a reduction in aerodynamic noise irrespective of whether the lower-surface plate is made of a member through which part of the air passes or a member through which the air does not pass.

Examples of the member through which part of the air passes include a porous plate and mesh-like plate. The serrations means the trailing edge formed in a saw-like shape along the longitudinal direction of the lower-surface plate.

A second aspect of the present invention relates to a wing including a main wing; and a high-lift device according to the first aspect of the present invention that is disposed so as to be able to extend from and retract into a leading edge of the main wing.

According to the second aspect of the present invention, the high-lift device of the present invention is provided, thereby suppressing the occurrence of aerodynamic noise while restricting an increase in weight.

A third aspect of the present invention relates to a noise reduction structure for a high-lift device including an airflow control part that is accommodated between a main wing and a concave part formed on a slat main body at a location facing the main wing, so as to be able to accommodate at least a part of a leading edge of the main wing when the slat main body, which is disposed so as to be able to extend from and retract into the main wing, is retracted into the main wing; and that suppresses the turbulence colliding against an upper surface of the main wing when the slat main body is extended from the main wing.

According to the third aspect of the present invention, when the slat main body is retracted into the main wing, the airflow control part is accommodated between the main wing and the concave part. Therefore, the leading edge of the main wing can be formed in a shape that does not impair the aerodynamic characteristics, without considering interference with the airflow control part.

When the slat main body is extended from the main wing, an air (shear layer) separated from the lower surface of the slat main body flows between the slat main body and the main wing, collides against the airflow control part, and flows along the airflow control part and the surface of the concave part.

Since the airflow control part can suppress the turbulence colliding against the airflow control part, it is possible to suppress the occurrence of aerodynamic noise caused by turbulence compared with a case where the airflow control part is not provided.

With the high-lift device according to the first aspect of the present invention, the wing according to the second aspect thereof, and the noise reduction structure for a high-lift device, according to the third aspect thereof, it is possible to suppress the turbulence colliding against the airflow control part. Therefore, compared with a case where the airflow control part is not provided, it is possible to suppress the occurrence of aerodynamic noise caused by turbulence.

Since a smaller number of components is required, there is an effect in that an increase in the airframe weight can be prevented.

Figure 1:
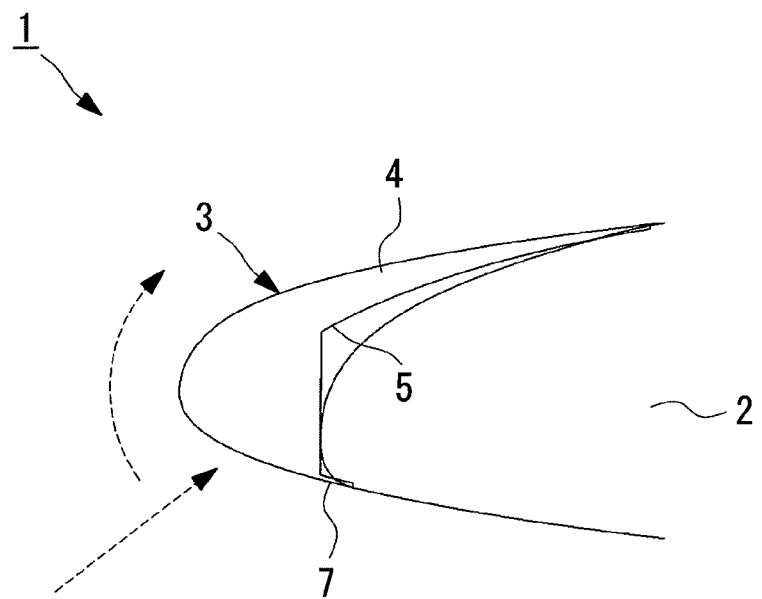
FIG. 1 is a view for explaining an outline of a wing according to a first embodiment of the present invention and is a partial enlarged view for explaining a state where a slat is retracted.

EXPLANATION OF REFERENCE SIGNS 1, 101, 201: wing
2: main wing
3: slat (high-lift device)
4: slat main body
5: cove (concave part)
6: inclined plate (airflow control part, noise reduction structure)
7: lower-surface plate
12: inclined surface
13: edge line
106, 206: airflow control part (noise reduction structure)
113, 113A: inclined plate
213: shock absorbing part

DETAILED DESCRIPTION OF THE INVENTION

First Embodiment

A wing according to a first embodiment of the present invention will be described with reference to FIGS. 1 to 15.

Figure 2:
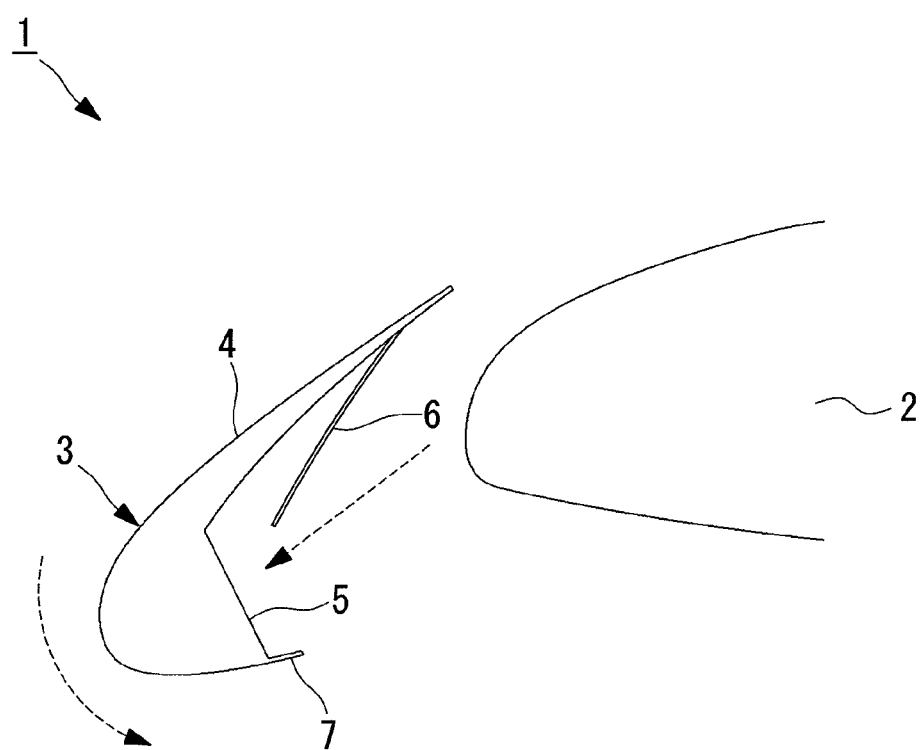
FIG. 2 is a partial enlarged view for explaining a state where the slat is extended in the wing shown in FIG. 1.

FIG. 1 is a view for explaining an outline of the wing according to this embodiment and is a partial enlarged view for explaining a state where a slat is retracted. FIG. 2 is a partial enlarged view for explaining a state where the slat is extended in the wing shown in FIG. 1.

As shown in FIGS. 1 and 2, a wing 1 includes a main wing 2 and a slat (high-lift device) 3.

The main wing 2 is a member constituting the wing 1 together with the slat 3. The main wing 2 is formed to have an airfoil section to realize required aerodynamic characteristics when the slat 3 is retracted to serve as the wing 1 and when the slat 3 is extended to serve as the paired main wing 2 and slat 3.

The slat 3 is disposed at the leading edge of the main wing 2. A drive mechanism (not shown) that retracts and extends the slat 3 is provided inside the main wing 2.

Note that the wing 1 may be constituted by only the main wing 2 and the slat 3, as described above, or another high-lift device, such as a flap, may additionally be disposed at the trailing edge of the main wing 2; the structure of the wing 1 is not particularly limited.

When the slat 3 is retracted as shown in FIG. 1, the slat 3 is brought into contact with the leading edge (the left end in FIG. 1) of the main wing 2, and the main wing 2 and the slat 3 integrally form the wing 1. On the other hand, when the slat 3 is extended as shown in FIG. 2, the slat 3 is lowered diagonally forward from the leading edge of the main wing 2 to produce a gap between the main wing 2 and the slat 3.

Further, the slat 3 pivots about the longitudinal axis of the slat 3 (the axis perpendicular to the plane of the paper of FIGS. 1 and 2) when being extended from the retracted state or when being retracted from the extended state. Specifically, when the slat 3 is extended from the retracted state, the slat 3 pivots (counterclockwise in FIG. 2) such that the leading edge of the slat 3 moves downward; and, when the slat 3 is retracted from the extended state, the slat 3 pivots (clockwise in FIG. 1) such that the leading edge of the slat 3 moves upward.

Figure 3:
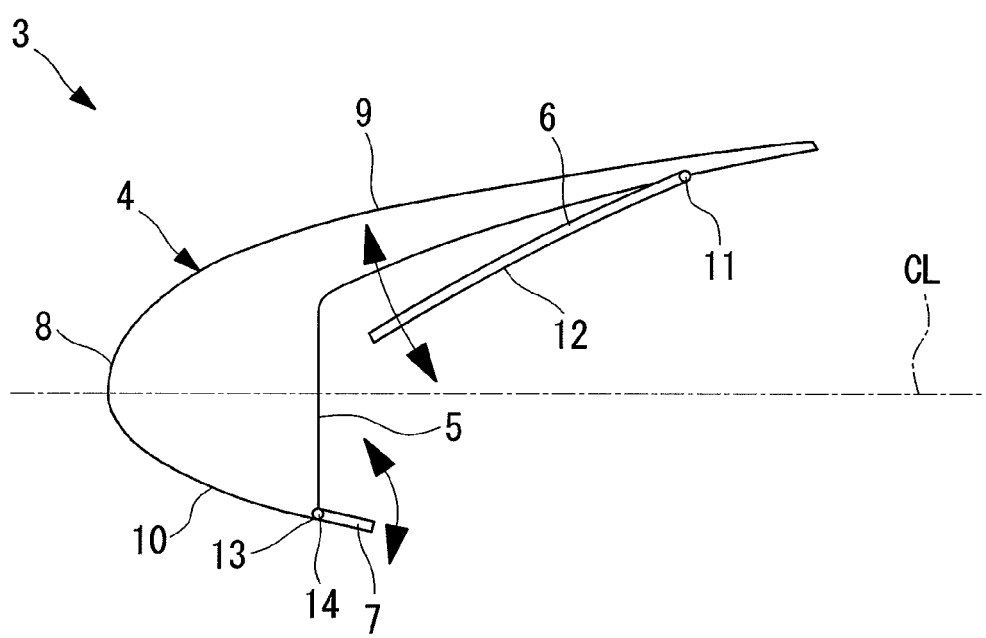
FIG. 3 is a schematic view for explaining the structure of the slat shown in FIG. 1.

FIG. 3 is a schematic view for explaining the structure of the slat shown in FIG. 1.

As shown in FIG. 3, the slat 3 includes a slat main body 4, a cove (concave part) 5, an inclined plate (airflow control part, noise reduction structure) 6, and a lower-surface plate 7.

The slat main body 4 is a member constituting the wing 1 together with the main wing 2 and is formed to have an airfoil section to realize required aerodynamic characteristics when the slat 3 is retracted to serve as the wing 1 and when the slat 3 is extended to serve as the paired slat 3 and main wing 2.

The slat main body 4 has a leading edge 8 serving as an air upstream end, and an upper surface 9 and a lower surface 10 along which an air flows. The cove 5 is formed on the slat main body 4 at a location that faces the main wing 2.

The upper surface 9 smoothly extends from the leading edge 8 and projects toward the main wing 2 further than the lower surface 10. The lower surface 10 smoothly extends from the leading edge 8 and has the lower-surface plate 7 disposed at the downstream end thereof.

The cove 5 is a concave part formed on the slat main body 4 at an area that faces the main wing 2 and accommodates the leading edge of the main wing 2 when the slat 3 is retracted.

In this embodiment, a description will be given of an example case where the cove 5 is formed by a front part of the cove 5 that is a surface perpendicular to a central axis CL and a rear part of the cove 5 that is an opposing surface that approaches the upper surface 9 toward the main wing 2. Note that the cove 5 is not limited to the above-mentioned structure, and it may have a single curved surface; the structure thereof is not particularly limited.

The inclined plate 6 is a plate-like member against which an airflow separated at the lower-surface plate 7 collides. The inclined plate 6 is pivotably supported with respect to the rear part of the cove 5 at a pivotal end (one end) 11 close to the main wing 2 (at the right side in FIG. 3). In other words, the inclined plate 6 is supported such that the end thereof close to the leading edge 8 (at the left side in FIG. 3) can extend from and retract into the central axis CL. The inclined plate 6 has surfaces inclined upward toward the main wing 2.

The inclined plate 6 is biased by an elastic member, such as a spring, in a direction in which the end thereof close to the leading edge 8 approaches the central axis CL. As a result, when the slat 3 is extended, the inclined plate 6 pivots by means of the elastic member in the direction in which the end thereof close to the leading edge 8 approaches the central axis CL. On the other hand, when the slat 3 is retracted, the inclined plate 6 is pressed by the upper surface of the main wing 2 to pivot in a direction in which the end thereof close to the leading edge 8 moves away from the central axis CL.

An inclined surface 12 of the inclined plate 6 that faces the main wing 2 is a surface against which the above-mentioned separated air collides and along which the colliding air flows.

Note that the inclined plate 6 may be configured such that the plate-like member is pivotably disposed as in the above-described embodiment, or it may be configured such that a wedge-shaped airflow control part is disposed so as to be able to retract and to extend with respect to the slat main body 4; the structure of the inclined plate 6 is not particularly limited.

The lower-surface plate 7 is a plate-like member extending toward the main wing 2 from an edge line 13 at which the lower surface 10 and the cove 5 meet. The lower-surface plate 7 is connected to the edge line 13 at a pivotal part 14 and is supported so as to be pivotable about the pivotal part 14. In other words, the lower-surface plate 7 is supported such that an end thereof close to the main wing 2 (at the right side in FIG. 3) can extend from and retract into the central axis CL.

The lower-surface plate 7 may be made of a plate-like member through which an air does not pass or it may be made by using a member, such as a porous plate or a mesh-like plate, through which part of the air passes; the member used for the lower-surface plate 7 is not particularly limited.

When the lower-surface plate 7 is made by using a member through which part of the air passes, a shear layer of the separated air is weakened to allow a reduction in aerodynamic noise.

Further, serrations, formed in a saw-like shape, may be provided at the trailing edge (the right edge in FIG. 3) of the lower-surface plate 7 along the longitudinal direction (the direction perpendicular to the plane of the paper of FIG. 3) of the lower-surface plate 7; the provision of serrations is not particularly limited.

When serrations are provided at the trailing edge of the lower-surface plate 7, the shear layer of the separated air is weakened to allow a reduction in aerodynamic noise irrespective of whether the lower-surface plate 7 is made of a member through which the air does not pass or a member through which part of the air passes.

Next, the operation of the wing 1, having the above-described structure, will be described.

The slat 3 of the wing 1 is extended from the main wing 2, as shown in FIG. 2, at the time of takeoff and landing, and it is retracted, as shown in FIG. 1, during cruising.

Note that the degree of extension of the slat 3 is different between takeoff and landing, and the slat 3 is extended more at landing than at takeoff. In this embodiment, a description will be given mainly of an operation performed at the time of landing, during which more aerodynamic noise is generated from the slat 3.

When aircraft provided with the wing 1 is about to land, the slat 3 is extended from the main wing 2, as shown in FIG. 2, in order to realize the aerodynamic characteristics required at the time of landing. Specifically, the slat 3 is extended to increase an angle of attack at which the wing 1 causes stalling, in other words, the slat 3 is extended so as not to cause stalling until a large angle of attack.

At the same time, the end of the inclined plate 6 that is close to the leading edge 8 pivots downward about the pivotal end 11. On the other hand, the end of the lower-surface plate 7 that is close to the main wing 2 pivots upward about the pivotal part 14.

When the aircraft provided with the wing 1 is in a cruising state, the slat 3 is retracted into the main wing 2, as shown in FIG. 1.

At this time, the end of the inclined plate 6 that is close to the leading edge 8 pivots upward about the pivotal end 11, and the inclined plate 6 moves to a location along the rear part of the cove 5. Thus, it is possible to avoid interference between the inclined plate 6 and the leading edge and upper surface of the main wing 2.

On the other hand, the end of the lower-surface plate 7 that is close to the main wing 2 pivots about the pivotal part 14 downward from the central axis CL and moves to a location where the lower surface 10 of the slat main body 4 is smoothly connected to the lower surface of the main wing 2. Thus, it is possible to avoid interference between the lower-surface plate 7 and the main wing 2 and also to prevent deterioration in the aerodynamic characteristics of the wing 1.

Next, measurement results of aerodynamic noise from the wing 1 of this embodiment will be described. A description will be given of comparisons with a conventional wing adopting no measures to reduce aerodynamic noise, the wing described in U.S. Pat. No. 6,394,396, and modifications of the wing 1 of this embodiment.

First, a measurement system will be described.

Figure 4:
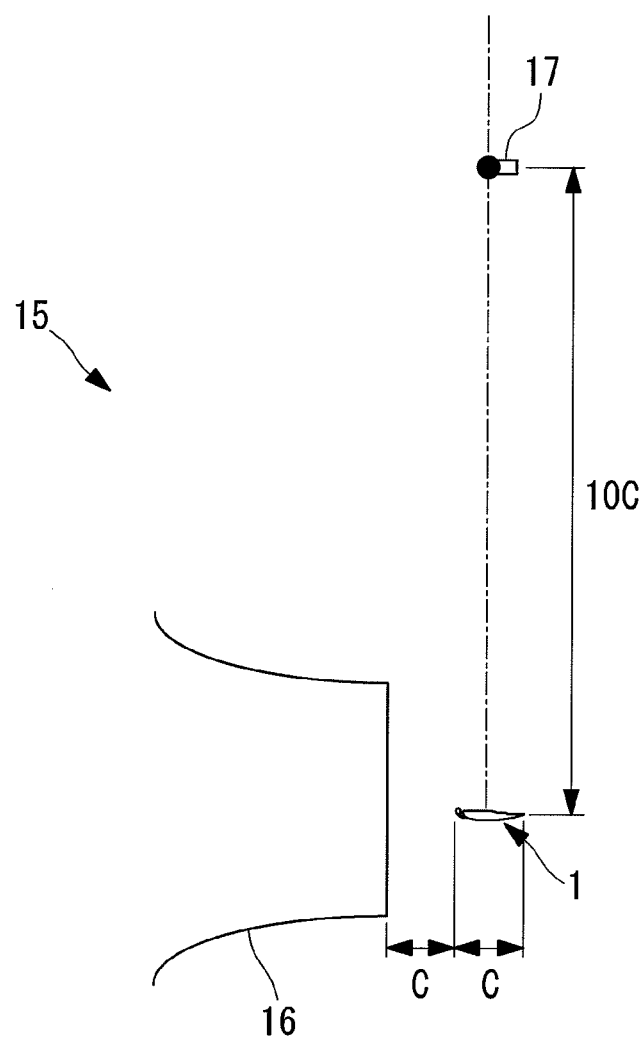
FIG. 4 is a view for explaining an outline of a measurement system used to measure aerodynamic noise from the wing shown in FIG. 1 and others.

FIG. 4 is a view for explaining an outline of the measurement system used to measure aerodynamic noise from the wing shown in FIG. 1 and others.

As shown in FIG. 4, a measurement system 15 includes a wind tunnel nozzle 16 that produces an air toward the wing 1 and a microphone 17 that measures aerodynamic noise generated from the wing 1.

An outlet of the wind tunnel nozzle 16 is disposed at a location a wing chord length C away from the leading edge 8 of the wing 1 (or of the slat main body 4).

The microphone 17 is disposed at the lower surface side of the wing 1 at a distance sufficient for far-field acoustic measurement. In other words, it is disposed at a location 10C away from the lower surface 10 of the wing 1.

Figure 5:
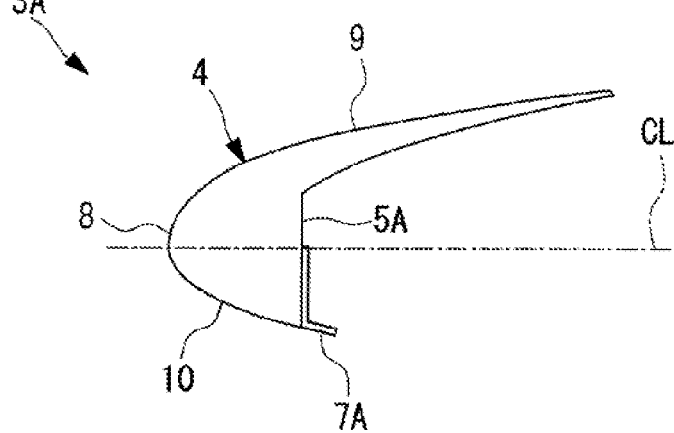
FIG. 5 is a view for explaining the shape of a conventional slat whose aerodynamic noise is measured by the measurement system shown in FIG. 4.

FIG. 5 is a view for explaining the shape of a conventional slat whose aerodynamic noise is measured by the measurement system shown in FIG. 4.

As shown in FIG. 5, a slat 3A of the conventional wing, whose aerodynamic noise is measured as a target for comparison with the wing 1 of this embodiment, has a lower-surface plate 7A extending along the lower surface 10 of the slat main body 4 and has space in a cove 5A to avoid interference with the main wing. The attachment angle of the lower-surface plate 7A is fixed.

Figure 6:
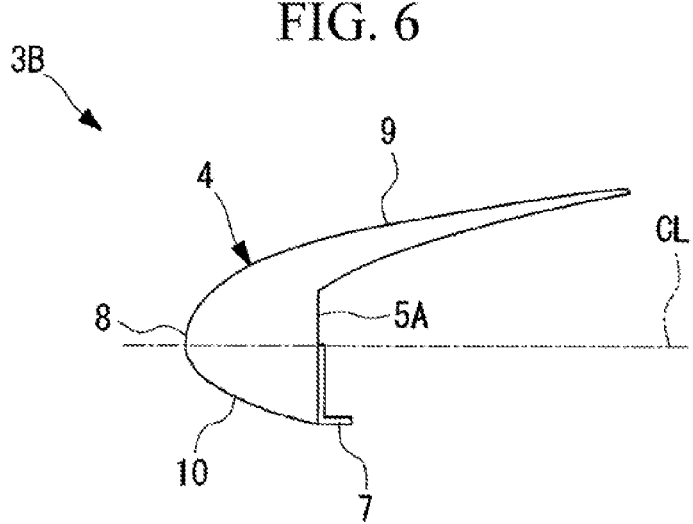
FIG. 6 is a view for explaining the shape of a slat that has only a lower-surface plate of this embodiment and whose aerodynamic noise is measured by the measurement system shown in FIG. 4.

FIG. 6 is a view for explaining the shape of a slat that has only the lower-surface plate of this embodiment and whose aerodynamic noise is measured by the measurement system shown in FIG. 4.

As shown in FIG. 6, in a slat 3B that has only the lower-surface plate 7 of this embodiment, whose aerodynamic noise is measured as a target for comparison with the wing 1 of this embodiment, the lower-surface plate 7 is fixed in a state where it has pivoted toward the central axis CL.

Figure 7:
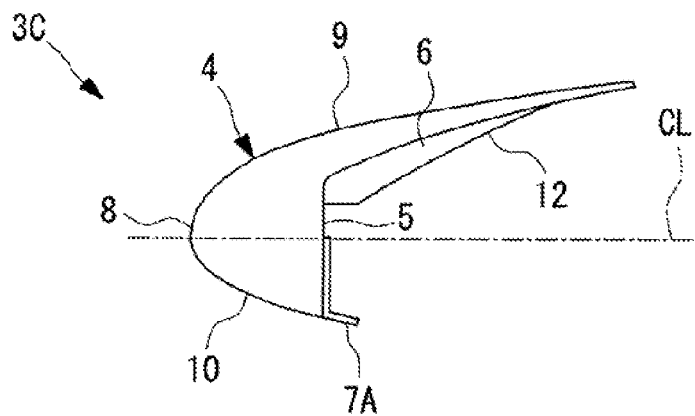
FIG. 7 is a view for explaining the shape of a slat that has only an airflow control part of this embodiment and whose aerodynamic noise is measured by the measurement system shown in FIG. 4.

FIG. 7 is a view for explaining the shape of a slat that has only the airflow control part of this embodiment and whose aerodynamic noise is measured by the measurement system shown in FIG. 4.

As shown in FIG. 7, a slat 3C that has only the inclined plate 6 of this embodiment, whose aerodynamic noise is measured as a target for comparison with the wing 1 of this embodiment, includes the lower-surface plate 7A extending along the lower surface 10 of the slat main body 4. In the cove 5, the inclined plate 6 of this embodiment is fixed in a state where the end thereof close to the slat main body 4 has pivoted toward the central axis CL.

Figure 8:
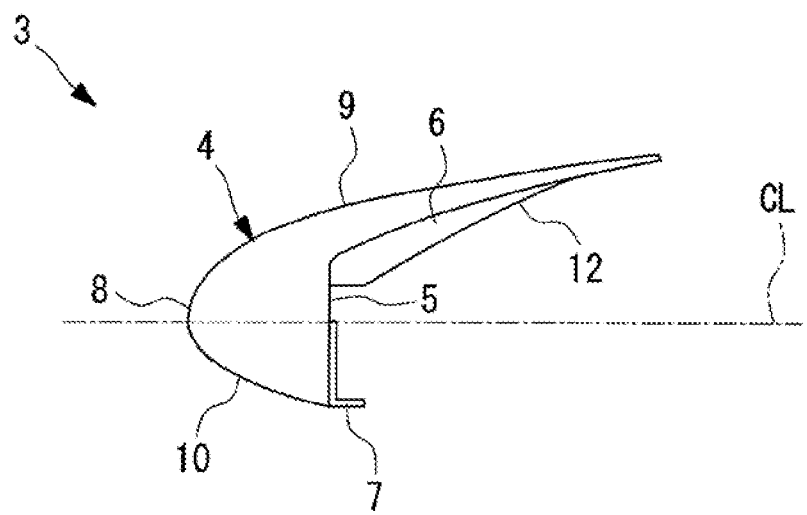
FIG. 8 is a view for explaining the shape of the slat of this embodiment, whose aerodynamic noise is measured by the measurement system shown in FIG. 4.

FIG. 8 is a view for explaining the shape of the slat of this embodiment, whose aerodynamic noise is measured by the measurement system shown in FIG. 4.

As shown in FIG. 8, in the slat 3 of this embodiment, whose aerodynamic noise is measured as a target for comparison with the wing 1 of this embodiment, the lower-surface plate 7 is fixed in a state where it has pivoted toward the central axis CL, and the inclined plate 6 is fixed in a state where it has pivoted toward the central axis CL.

Figure 9:
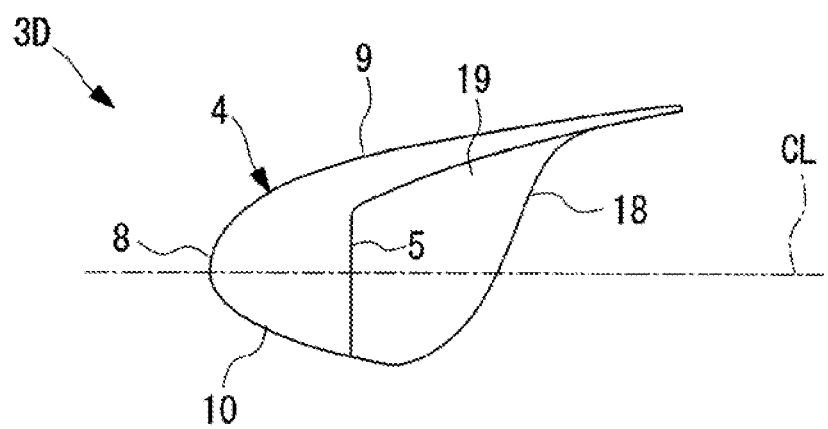
FIG. 9 is a view for explaining the shape of a slat described in U.S. Pat. No. 6,394,396, whose aerodynamic noise is measured by the measurement system shown in FIG. 4.

FIG. 9 is a view for explaining the shape of the slat described in U.S. Pat. No. 6,394,396, whose aerodynamic noise is measured by the measurement system shown in FIG. 4.

As shown in FIG. 9, a slat 3D described in U.S. Pat. No. 6,394,396, whose aerodynamic noise is measured as a target for comparison with the wing 1 of this embodiment, includes a filling member 19 that fills the cove 5 and that has a curved surface 18 for guiding an air flowing along the lower surface 10 of the slat main body 4.

Figure 10:
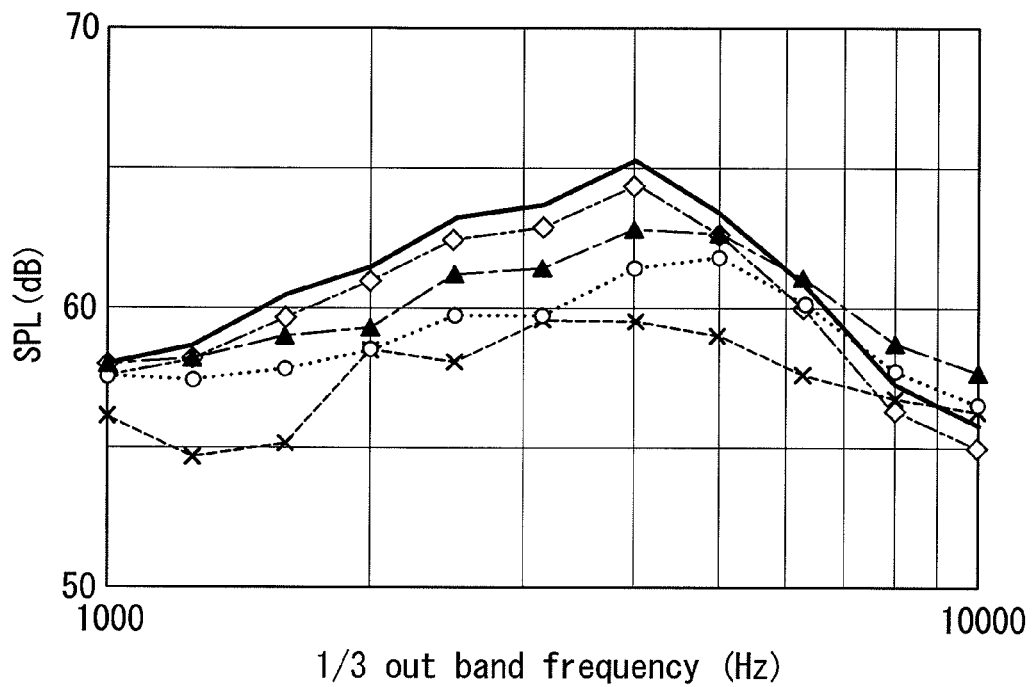
FIG. 10 shows graphs indicating measurement results of aerodynamic noise from the slats shown in FIGS. 5 to 9.

FIG. 10 shows graphs indicating measurement results of aerodynamic noise from the slats shown in FIGS. 5 to 9.

In FIG. 10, a thick line shows a graph indicating the sound pressure level (SPL (dB)) of aerodynamic noise from the slat 3A (see FIG. 5), outline diamond shapes (◇) show a graph indicating the sound pressure level of aerodynamic noise from the slat 3B (see FIG. 6), solid triangles (▲) show a graph indicating the sound pressure level of aerodynamic noise from the slat 3C (see FIG. 7), outline circles (○) show a graph indicating the sound pressure level of aerodynamic noise from the slat 3 (see FIG. 8) of this embodiment, and the crosses (X) show a graph indicating the sound pressure level of aerodynamic noise from the slat 3D (see FIG. 9).

As shown in FIG. 10, the sound pressure level of the aerodynamic noise from the slat 3D is the lowest, followed by the sound pressure level of aerodynamic noise from the slat 3. The sound pressure level is then increased in the order of the slat 3C and the slat 3B, the sound pressure level of aerodynamic noise from the slat 3A being the highest.

Next, a description will be given of a flow field produced around each slat and the main wing when the slat is extended.

Figure 11:
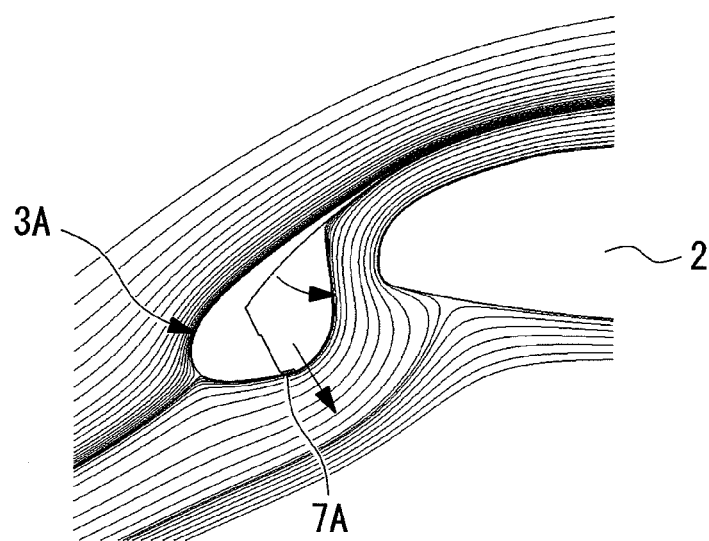
FIG. 11 is a view showing streamlines for explaining a flow field produced around the slat shown in FIG. 5 and the main wing when the slat is extended.

FIG. 11 is a view showing streamlines for explaining a flow field produced around the slat shown in FIG. 5 and the main wing when the slat is extended.

When the slat 3A is extended from the main wing 2, an air flows along the leading edge 8 of the slat main body 4, part thereof flows from the leading edge 8 along the upper surface 9, and the rest thereof flows from the leading edge 8 along the lower surface 10, as shown in FIG. 11.

The air flowing along the lower surface 10 flows from the lower surface 10 along the lower-surface plate 7A and is separated at the end of the lower-surface plate 7A. The separated air flows in the direction in which the lower-surface plate 7A extends, and then flows between the cove 5 of the slat main body 4 and the main wing 2 to collide against the rear part of the cove 5. The colliding air flows along the rear part of the cove 5, joins the air flowing along the upper surface 9, and flows along the upper surface of the main wing 2.

This aspect indicates a conventional aspect of the slat.

Figure 12:
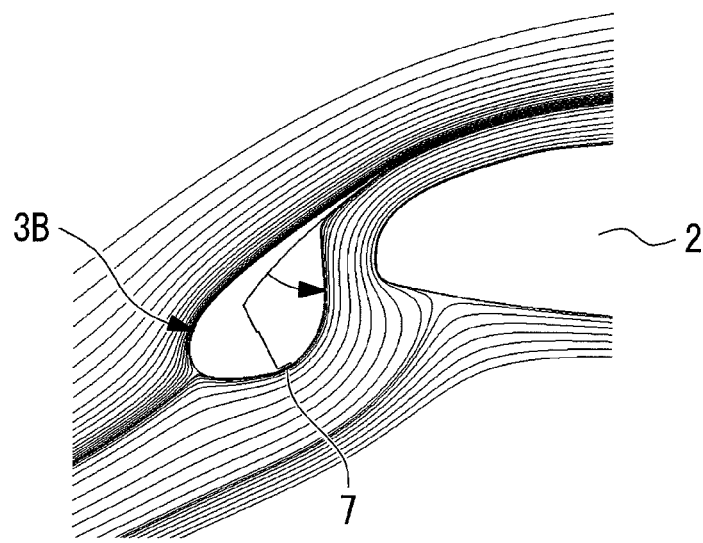
FIG. 12 is a view showing streamlines for explaining a flow field produced around the slat shown in FIG. 6 and the main wing when the slat is extended.

FIG. 12 is a view showing streamlines for explaining a flow field produced around the slat shown in FIG. 6 and the main wing when the slat is extended.

When the slat 3B is extended from the main wing 2, as shown in FIG. 12, part of the air flows from the leading edge 8 along the upper surface 9, and the rest thereof flows from the leading edge 8 along the lower surface 10, in the same way as described above.

The air flowing along the lower surface 10 flows from the lower surface 10 along the lower-surface plate 7 and is separated at the end of the lower-surface plate 7. The separated air flows in the direction in which the lower-surface plate 7 extends, and then flows between the cove 5A of the slat main body 4 and the main wing 2 to collide against the rear part of the cove 5A. The colliding air flows along the rear part of the cove 5A, joins the air flowing along the upper surface 9, and flows along the upper surface of the main wing 2.

Compared with the above-described slat 3A of the conventional aspect, the air separated from the end of the lower-surface plate 7 flows while being deflected toward the cove 5A, thereby weakening the shear layer of the separated air. Further, the separated air is deflected, thereby reducing the collision angle of the airflow with respect to the rear part of the cove 5A.

Figure 13:
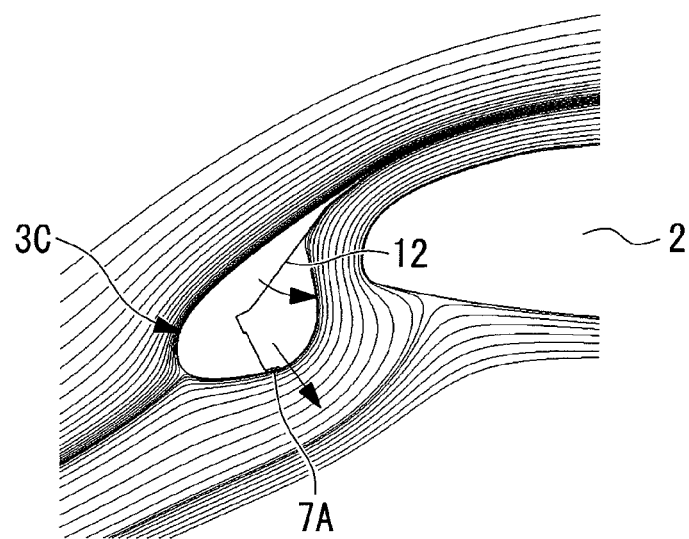
FIG. 13 is a view showing streamlines for explaining a flow field produced around the slat shown in FIG. 7 and the main wing when the slat is extended.

FIG. 13 is a view showing streamlines for explaining a flow field produced around the slat shown in FIG. 7 and the main wing when the slat is extended.

When the slat 3C is extended from the main wing 2, as shown in FIG. 12, part of the air flows from the leading edge 8 along the upper surface 9, and the rest thereof flows from the leading edge 8 along the lower surface 10, in the same way as described above.

The air flowing along the lower surface 10 flows from the lower surface 10 along the lower-surface plate 7A and is separated at the end of the lower-surface plate 7A. The separated air flows in the direction in which the lower-surface plate 7A extends, and then flows between the cove 5 of the slat main body 4 and the main wing 2 to collide against the inclined surface 12 of the inclined plate 6. The colliding air flows along the inclined surface 12 and the rear part, joins the air flowing along the upper surface 9, and flows along the upper surface of the main wing 2.

Compared with the above-described slat 3A of the conventional aspect, the airflow separated from the end of the lower-surface plate 7A flows between the cove 5 and the main wing 2 to collide against the inclined surface 12 of the inclined plate 6. The inclined surface 12 has a smaller angle than the rear part of the cove 5A, with respect to the separated air, thus reducing the collision angle of the airflow.

Figure 14:
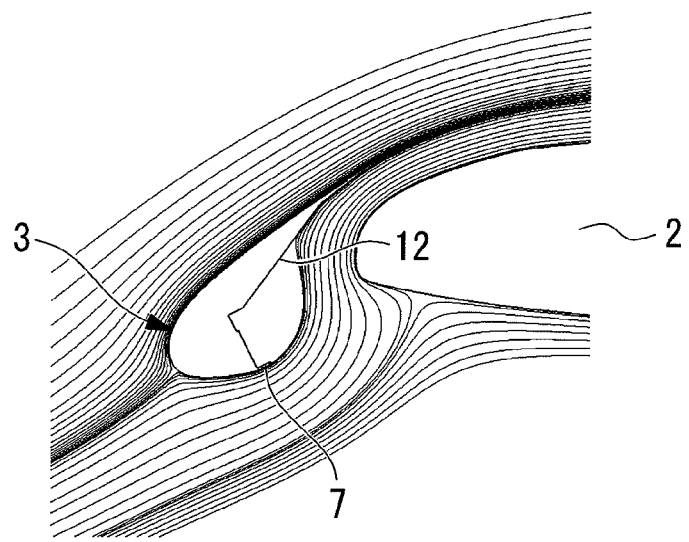
FIG. 14 is a view showing streamlines for explaining a flow field produced around the slat shown in FIG. 8 and the main wing when the slat is extended.

FIG. 14 is a view showing streamlines for explaining a flow field produced around the slat shown in FIG. 8 and the main wing when the slat is extended.

When the slat 3 is extended from the main wing 2, as shown in FIG. 14, part of the air flows from the leading edge 8 along the upper surface 9, and the rest thereof flows from the leading edge 8 along the lower surface 10, in the same way as described above.

The air flowing along the lower surface 10 flows from the lower surface 10 along the lower-surface plate 7 and is separated at the end of the lower-surface plate 7. The separated air flows in the direction in which the lower-surface plate 7 extends, and then flows between the cove 5 of the slat main body 4 and the main wing 2 to collide against the inclined surface 12 of the inclined plate 6. The colliding air flows along the inclined surface 12, joins the air flowing along the upper surface 9, and flows along the upper surface of the main wing 2.

Compared with the slats 3A and 3C described above, the shear layer of the separated air is weakened due to the effect of the lower-surface plate 7 and the collision angle of the airflow with respect to the inclined surface 12 of the inclined plate 6 is reduced.

Compared with the above-described slat 3B, which has the same lower-surface plate 7, the collision angle of the airflow with respect to the inclined surface 12 of the inclined plate 6 is reduced due to the effect of the inclined plate 6.

As described above, compared with the slats 3A, 3B, and 3C, the shear layer of the separated air is weakened and the collision angle of the airflow is reduced. Therefore, it is considered that generation of pressure fluctuation is suppressed to reduce the aerodynamic noise.

Figure 15:
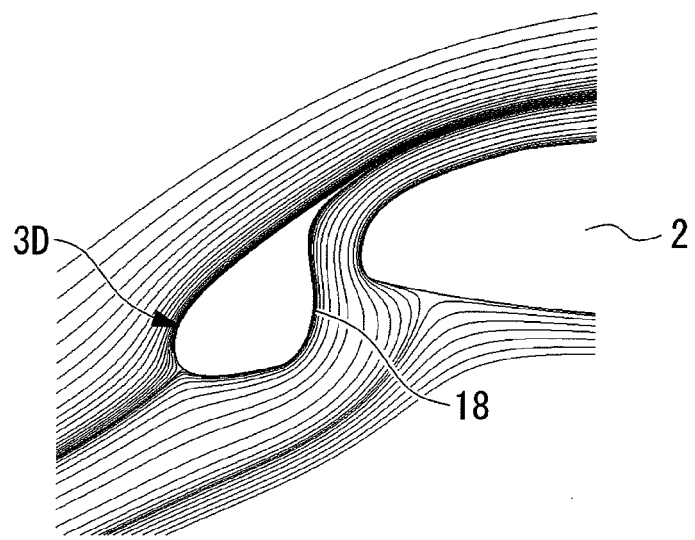
FIG. 15 is a view showing streamlines for explaining a flow field produced around the slat shown in FIG. 9 and the main wing when the slat is extended.

FIG. 15 is a view showing streamlines for explaining a flow field produced around the slat shown in FIG. 9 and the main wing when the slat is extended.

Finally, when the slat 3D is extended from the main wing 2, as shown in FIG. 15, part of the air flows from the leading edge 8 along the upper surface 9, and the rest thereof flows from the leading edge 8 along the lower surface 10, in the same way as described above.

The air flowing along the lower surface 10 flows from the lower surface 10 along the curved surface 18 and flows between the slat main body 4 and the main wing 2. Then, the airflow smoothly changes its direction along the curved surface 18, joins the air flowing along the upper surface 9, and flows along the upper surface of the main wing 2.

Since the air flows without collision, unlike the above-described cases, it is considered that the sound pressure level of generated aerodynamic noise is the lowest among the above-described slats.

According to the above-described structure, when the slat main body 4 is extended from the main wing 2, part of the air flows along the lower surface 10 of the slat main body 4 and is separated from the lower surface 10. The separated air (shear layer) flows between the slat main body 4 and the main wing 2, collides against the inclined surface 12, and flows along the inclined surface 12 and the surface of the cove 5.

Since the angle of the inclined surface 12 of the inclined plate 6 with respect to the central axis CL can be deflected, the collision angle of the above-mentioned shear layer and the inclined surface 12 can be deflected. Therefore, compared with a case where a collision angle cannot be deflected, it is possible to suppress the occurrence of aerodynamic noise by selecting a collision angle at which less aerodynamic noise occurs.

On the other hand, compared with the technology described in U.S. Pat. No. 6,394,396, a smaller number of components is required, preventing an increase in weight.

When the slat main body 4 is retracted into the main wing 2, the cove 5 accommodates the leading edge of the main wing 2. At this time, since the angle of the inclined surface 12 with respect to the central axis CL can be deflected, the angle of the inclined surface 12 is deflected at an angle for avoiding interference with the upper surface of the main wing 2. Thus, the leading edge of the main wing 2 can be formed in a shape that does not impair the aerodynamic characteristics, without considering interference with the inclined surface 12 of the inclined plate 6.

When the slat main body 4 is retracted into the main wing 2, the other end of the inclined plate 6 pivots toward a location where interference with the leading edge of the main wing 2 does not occur and the aerodynamic characteristics are not impaired, in other words, it pivots upward about the one end. Therefore, it is possible to avoid interference by widening the gap between the inclined surface 12 and the upper surface of the main wing 2.

When the slat main body 4 is extended from the main wing 2, the end of the inclined plate 6 pivots downward with respect to the central axis CL, in other words, it pivots downward about the pivotal end 11. Therefore, the above-described collision angle of the airflow and the inclined surface 12 can be reduced.

When the slat main body 4 is retracted into the main wing 2, the cove 5 accommodates the leading edge of the main wing 2. At this time, since the angle of the lower-surface plate 7 with respect to the central axis can be deflected, the angle of the lower-surface plate 7 with respect to the central axis CL is deflected at an angle for smoothly connecting the lower surface 10 of the slat main body 4 to the lower surface of the main wing 2. Thus, deterioration in the aerodynamic characteristics of the wing 1, having the slat main body 4 and the main wing 2, can be restricted.

When the slat main body 4 is extended from the main wing 2, part of the air flows along the lower surface 10 of the slat main body 4 and the lower-surface plate 7 and is separated from the lower-surface plate 7. Since the angle of the lower-surface plate 7 with respect to the central axis CL can be deflected, the direction of the separated air can be deflected. Thus, compared with a case where the airflow is separated from the lower-surface plate positioned in the same state as when the slat main body is retracted into the main wing, the direction of the separated air can be deflected to weaken the shear layer, thereby suppressing the occurrence of aerodynamic noise.

On the other hand, the separated air flows between the slat main body 4 and the main wing 2, collides against the inclined surface 12, and flows along the inclined surface 12 and the surface of the cove 5.

Since the angle of the lower-surface plate 7 with respect to the central axis CL can be deflected, it is possible to deflect the direction of the separated air to deflect the collision angle of the separated air with respect to the inclined surface 12. Therefore, compared with a case where the direction of the separated air cannot be deflected, it is possible to suppress the occurrence of aerodynamic noise by selecting a collision angle at which less aerodynamic noise occurs.

On the other hand, even when the end of the lower-surface plate 7 that is close to the main wing 2 pivots downward with respect to the central axis CL, if a porous plate or the like is used for the lower-surface plate 7, the shear layer of the separated air is weakened, thereby allowing a reduction in aerodynamic noise.

When the slat main body 4 is retracted into the main wing 2, the end of the lower-surface plate 7 that is close to the main wing 2 pivots toward a location where interference with the leading edge of the main wing 2 does not occur and the aerodynamic characteristics are not impaired, in other words, it pivots downward. Therefore, it is possible to avoid interference between the lower-surface plate 7 and the leading edge of the main wing 2. Further, the lower-surface plate 7 can smoothly connect the lower surface 10 of the slat main body 4 to the lower surface of the main wing 2.

When the slat main body 4 is extended from the main wing 2, the end of the lower-surface plate 7 that is close to the main wing 2 pivots upward with respect to the central axis CL, in other words, it pivots upward. Therefore, it is possible to deflect the direction of the separated air to reduce the collision angle of the separated air with respect to the inclined surface 12.

Second Embodiment

Next, a second embodiment of the present invention will be described with reference to FIGS. 16 to 20.

Although the basic structure of a wing of this embodiment is the same as that of the first embodiment, the structure of a noise reduction structure in a slat is different from that of the first embodiment. Therefore, in this embodiment, only the slat and the components surrounding it will be described with reference to FIGS. 16 to 20, and a description of the main wing etc. will be omitted.

Figure 16:
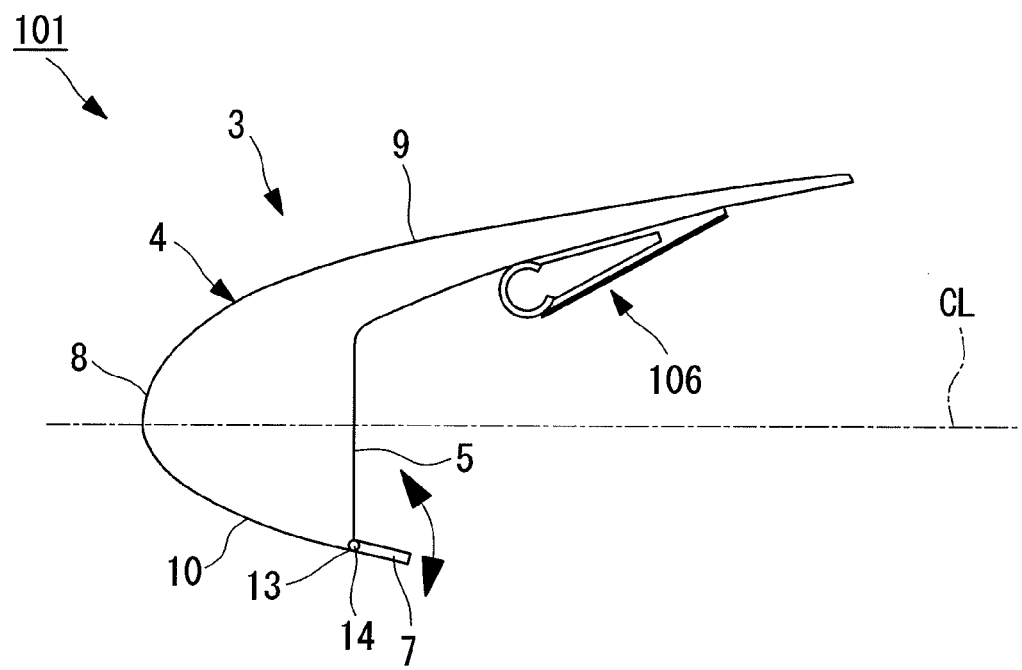
FIG. 16 is a cross-sectional view for explaining the structure of a slat according to a second embodiment of the present invention.
Figure 17:
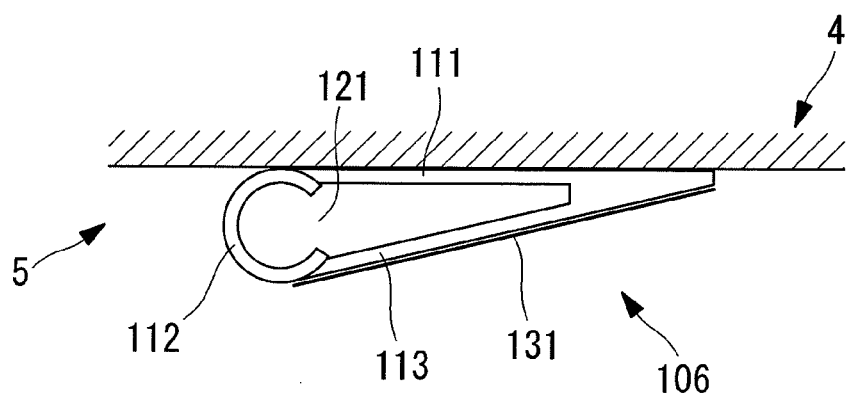
FIG. 17 is a cross-sectional view for explaining the structure of an airflow control part shown in FIG. 16.
Figure 18:
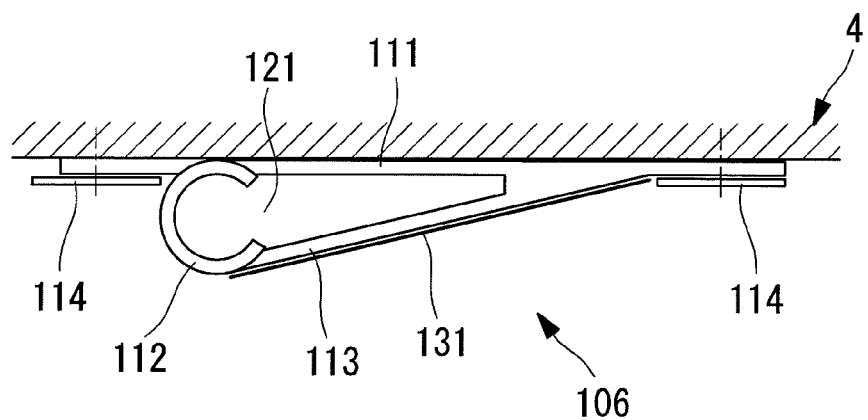
FIG. 18 is a cross-sectional view for explaining a structure for mounting the airflow control part shown in FIG. 17 to the slat.

FIG. 16 is a cross-sectional view for explaining the structure of the slat according to this embodiment. FIG. 17 is a cross-sectional view for explaining the structure of an airflow control part shown in FIG. 16. FIG. 18 is a cross-sectional view for explaining a structure for mounting the airflow control part shown in FIG. 17 to the slat.

Note that the same reference symbols are given to the same components as those of the first embodiment, and a description thereof will be omitted.

As shown in FIGS. 16 to 18, the slat 3 of a wing 101 includes the slat main body 4, the cove 5, and an airflow control part (noise reduction structure) 106.

The airflow control part 106 is a part against which an airflow separated at the lower-surface plate 7 collides and that suppresses the aerodynamic noise.

The airflow control part 106 includes a base plate 111, a seal part 112, an inclined plate 113, and holding parts 114. The base plate 111, the seal part 112, and the inclined plate 113 are integrally formed by using an elastic member, such as silicone rubber, chloroprene rubber, nitrile rubber, fluorosilicone rubber, or fluororubber.

Thus, compared with a case where the inclined plate 113 is made by using a material different from that of the seal part 112, etc., it is possible to integrally form the airflow control part 106 by using an identical material, such as rubber, which allows the airflow control part 106 to be formed easily. Further, since the airflow control part 106 is integrally formed, the inclined plate 113 is hardly separated from the seal part 112, etc.

The base plate 111 is a plate-like member that extends along a wall surface of the slat main body 4. As shown in FIG. 18, the base plate 111 fixes the airflow control part 106 to the slat main body 4 together with the holding parts 114. Further, the seal part 112 is disposed in the vicinity of a leading-edge end (the left end in FIGS. 17 and 18) of the base plate 111, and an end of the inclined plate 113 is disposed in the vicinity of a trailing-edge end (the right end in FIGS. 17 and 18) of the base plate 111.

The seal part 112 is a member that has an approximately C-shaped cross section and that extends in the longitudinal direction (the direction perpendicular to the plane of the paper of FIGS. 17 and 18) of the slat main body 4. The seal part 112 exerts a sealing function when the slat main body 4 is retracted, and it exerts a function of maintaining the inclination of the inclined plate 113 at a predetermined angle by using the elasticity of the seal part 112 when the slat main body 4 is extended.

In the seal part 112, a cutout part 121 is provided that opens toward the trailing edge of the wing 101 and that extends in the longitudinal direction of the slat main body 4. An end of the base plate 111 is disposed at an end (the upper end in FIGS. 17 and 18) of the seal part 112 that is close to the slat main body 4, and an end of the inclined plate 113 is disposed at the other end (the lower end in FIGS. 17 and 18) of the seal part 112 that is close to the main wing 2.

The inclined plate 113 is a plate-like member against which the airflow separated at the lower-surface plate 7 collides.

Of the inclined plate 113, the end close to the trailing edge (at the right side in FIGS. 17 and 18) is disposed on the base plate 111, and the other end close to the leading edge (at the left side in FIGS. 17 and 18) is disposed on the seal part 112.

In other words, the end of the inclined plate 113 that is close to the leading edge is supported by the seal part 112 so as to be able to extend from and retract into the central axis CL (see FIG. 16). The inclined plate 113 serves as an inclined surface that is inclined upward with respect to the main wing 2.

A sliding layer 131 that is made of polytetrafluoroethylene (Teflon (registered trademark)), polyester, or the like is provided on the surface of the inclined plate 113 that faces the main wing 2. More specifically, the sliding layer 131 is provided in an area that contacts the main wing 2 when the slat main body 4 is retracted.

The holding parts 114 are a pair of plate-like members that extend along the wall surface of the slat main body 4. As shown in FIG. 18, the holding parts 114 sandwich the base plate 111 between the holding parts 114 and the slat main body 4 to fix the airflow control part 106 to the slat main body 4.

One of the holding parts 114 that is close to the leading edge is disposed to sandwich the base plate 111, which extends toward the leading edge further than the seal part 112, between the holding part 114 and the slat main body 4, and is fixed to the slat main body 4 with fasteners such as screws.

The other one of the holding parts 114 that is close to the trailing edge is disposed to sandwich the base plate 111, which extends toward the trailing edge further than the inclined plate 113, between the holding part 114 and the slat main body 4, and is fixed to the slat main body 4 with fasteners such as screws.

Next, the operation of the wing 101, having the above-described structure, will be described.

Figure 19:
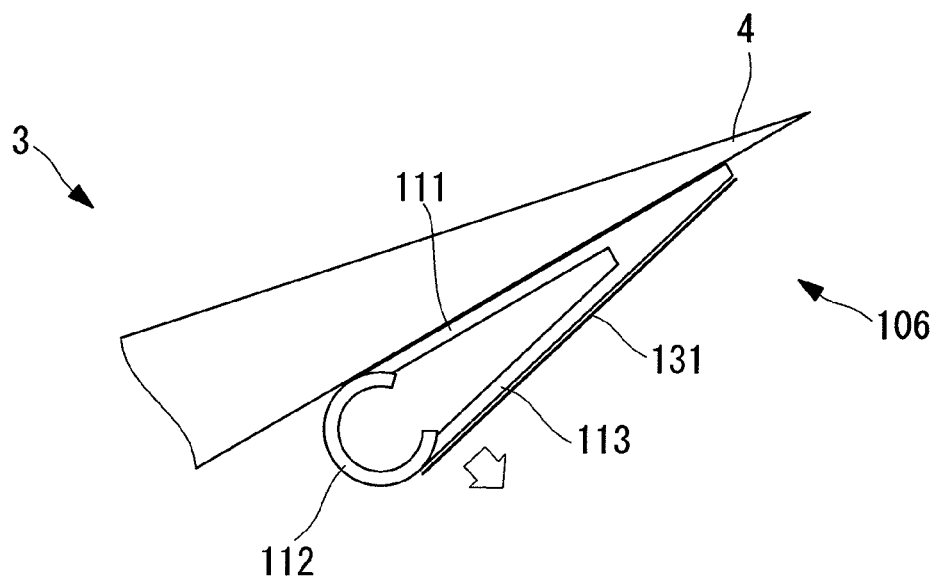
FIG. 19 is a view for explaining the state of the airflow control part when the slat is extended from the main wing.

FIG. 19 is a view for explaining the state of the airflow control part when the slat is extended from the main wing.

When aircraft provided with the wing 101 is about to land or take off, the slat 3 is extended, as shown in FIG. 19, in order to realize the aerodynamic characteristics required at the time of landing or takeoff.

At the same time, the seal part 112 that was elastically deformed restores its original shape, and thus the end of the inclined plate 113 that is close to the leading edge pivots downward.

Figure 20:
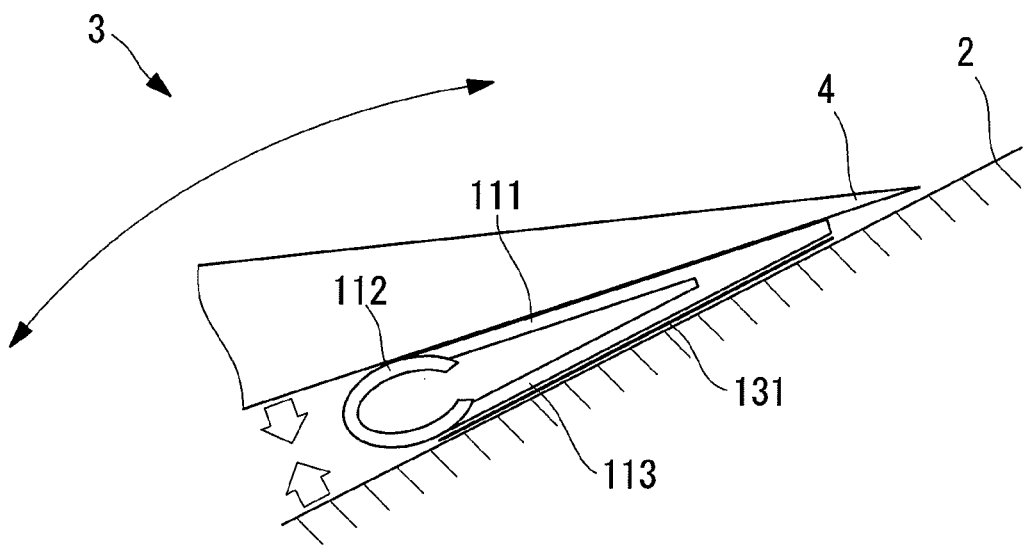
FIG. 20 is a view for explaining the state of the airflow control part when the slat is retracted into the main wing.

FIG. 20 is a view for explaining the state of the airflow control part when the slat is retracted into the main wing.

When the aircraft provided with the wing 101 is in the cruising state, the slat 3 is retracted into the main wing 2, as shown in FIG. 20.

At this time, the seal part 112 and the inclined plate 113 of the airflow control part 106 are brought into contact with the main wing 2. The seal part 112 is pressed and deformed by the main wing 2 and the slat main body 4. On the other hand, the inclined plate 113 approaches the slat main body 4. Therefore, interference between the airflow control part 106 and the leading edge and upper surface of the main wing 2 can be avoided.

Further, when the slat 3 is being extended or retracted, the sliding layer 131 on the inclined plate 113 moves from the leading edge side to the trailing edge side or from the trailing edge side to the leading edge side, while being in contact with the main wing 2. Since the sliding layer 131 is made of a material that has a low friction coefficient, such as polytetrafluoroethylene, the frictional resistance generated when the inclined plate 113 and the main wing 2 relatively move is reduced.

In other words, it is possible to restrict an increase in the load imposed on an actuator (not shown) that extends and retracts the slat 3.

According to the above-described structure, when the slat main body 4 is retracted into the main wing 2, the seal part 112 is brought into contact with the upper surface of the main wing 2. Therefore, a gap between the slat main body 4 and the main wing 2 is sealed, thus preventing water, dust, etc. from entering the cove 5.

Further, since the seal part 112 is brought into contact with the upper surface of the main wing 2 and deformed, the end of the inclined plate 113 that is close to the leading edge is deformed toward a location where interference with the leading edge of the main wing 2 does not occur and the aerodynamic characteristics are not impaired. In other words, it is deformed upward about the end close to the trailing edge (that is, in the direction in which it moves away from the central axis CL (see FIG. 16)).

Therefore, the airflow control part 106 can be accommodated in the gap between the slat main body 4 and the upper surface of the main wing 2 without interference.

On the other hand, when the slat main body 4 is extended from the main wing 2, the shape of the seal part 112 that was in contact with and pressed by the upper surface of the main wing 2 is restored. Accordingly, the shape of the inclined plate 113 that was deformed upward with respect to the central axis CL (see FIG. 16) about the end close to the trailing edge is also restored.

Therefore, the collision angle of the above-mentioned shear layer and the inclined plate 113 can be reduced.

Figure 21:
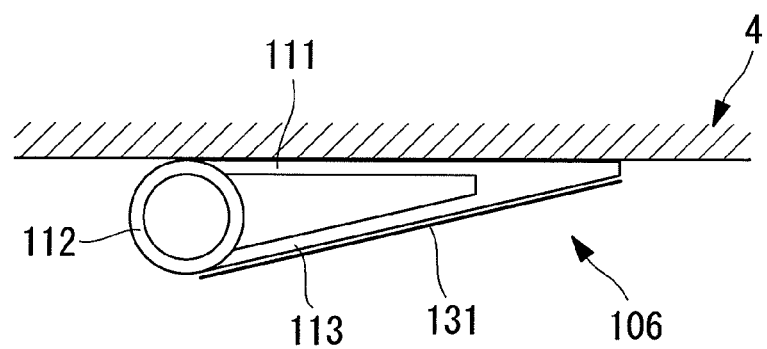
FIG. 21 is a cross-sectional view for explaining another embodiment of the airflow control part shown in FIG. 17.
Figure 22:
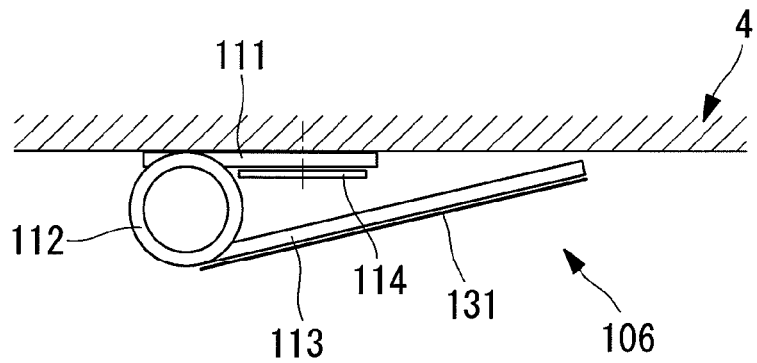
FIG. 22 is a cross-sectional view for explaining a structure for mounting an airflow control part shown in FIG. 21 to a strut.

FIG. 21 is a cross-sectional view for explaining another embodiment of the airflow control part shown in FIG. 17. FIG. 22 is a cross-sectional view for explaining a structure for mounting an airflow control part shown in FIG. 21 to the slat.

Note that the seal part 112 may be provided with the cutout part 121, as described above, or the seal part 112 may not be provided with the cutout part 121, as shown in FIG. 21; the structure of the seal part 112 is not particularly limited.

When the airflow control part 106 has the seal part 112 that is not provided with the cutout part 121, the holding part 114 may be disposed between the inclined plate 113 and the slat main body 4 to mount the airflow control part 106 to the slat main body 4, as shown in FIG. 22; the location of the holding part 114 is not particularly limited.

In other words, the holding part 114 may be disposed so as to sandwich the base plate 111 that extends from the seal part 112 toward the trailing edge, between the holding part 114 and the slat main body 4.

Figure 23:
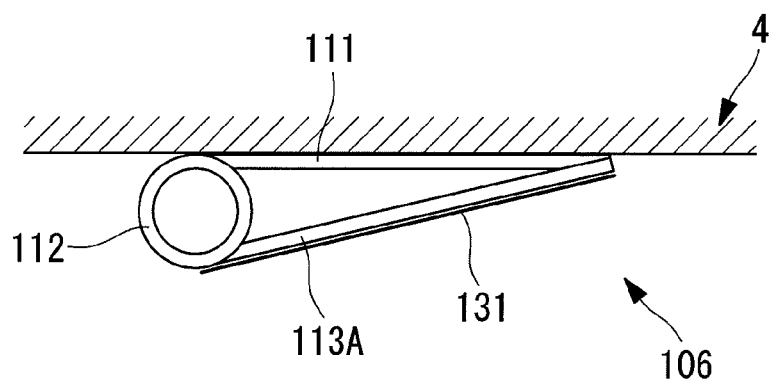
FIG. 23 is a cross-sectional view for explaining still another embodiment of the airflow control part shown in FIG. 17.

FIG. 23 is a cross-sectional view for explaining still another embodiment of the airflow control part shown in FIG. 17.

Note that, as described above, the inclined plate 113 may be made of rubber, which is an elastic member, like the seal part 112, or, as shown in FIG. 23, an inclined plate 113A may be made of a rigid material, such as a synthetic resin or metal, unlike the seal part 112 etc.; the material used for the inclined plate is not particularly limited.

Thus, compared with the inclined plate 113 made of rubber or the like, even when an airflow collides against the inclined plate 113A, the inclined plate 113A is less deformed, thus more effectively suppressing the turbulence of the colliding airflow. In short, it is possible to suppress the occurrence of aerodynamic noise caused by turbulence.

Third Embodiment

Next, a third embodiment of the present invention will be described with reference to FIG. 24.

Although the basic structure of a wing of this embodiment is the same as that of the second embodiment, the structure of a noise reduction is different from that of the second embodiment. Therefore, in this embodiment, only the slat and the components surrounding it will be described with reference to FIG. 24, and a description of the main wing etc. will be omitted.

Figure 24:
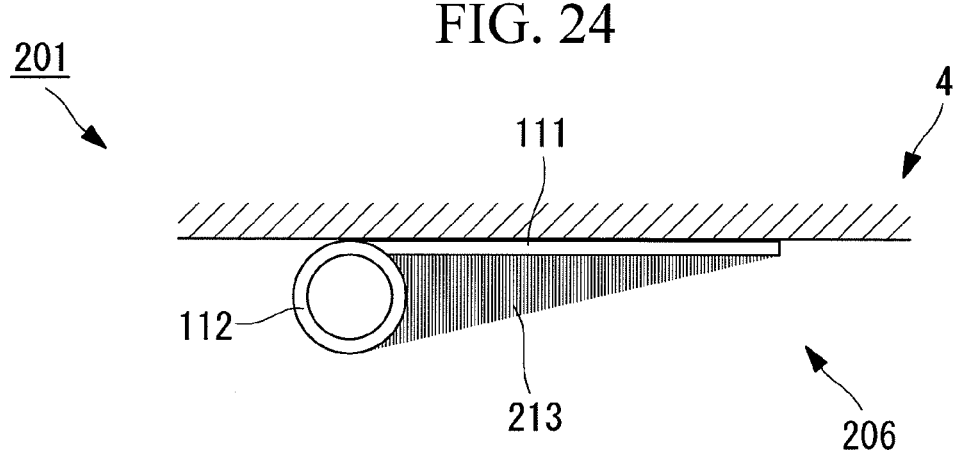
FIG. 24 is a cross-sectional view for explaining the structure of an airflow control part according to a third embodiment of the present invention.

FIG. 24 is a cross-sectional view for explaining the structure of an airflow control part according to this embodiment.

Note that the same reference symbols are given to the same components as those of the second embodiment, and a description thereof will be omitted.

As shown in FIG. 24, the slat 3 of a wing 201 includes the slat main body 4, the cove 5, and an airflow control part (noise reduction structure) 206.

The airflow control part 206 suppresses the turbulence.

The airflow control part 206 includes the base plate 111, the seal part 112, and a shock absorbing part 213. The base plate 111 and the seal part 112 are integrally formed by using an elastic member, such as silicone rubber, chloroprene rubber, nitrile rubber, fluorosilicone rubber, or fluororubber.

The shock absorbing part 213 is a part against which an airflow separated at the lower-surface plate 7 collides and that suppresses the turbulence.

The shock absorbing part 213 has a flocculent material formed of a plurality of fibers, for example, polyester fibers, that extend toward the main wing 2 from the base plate 111, which extends from the seal part 112 toward the trailing edge. In other words, the shock absorbing part 213 has a flocculent material formed of thin soft fibers, like bird feathers and down, or a flocculent material obtained by mixing threadlike synthetic fibers into the thin soft fibers like feathers and down and by making them fire retardant.

In other words still, the plurality of fibers constituting the flocculent material are planted in the base plate 111, like mouton or a boa.

On the other hand, an end surface of the shock absorbing part 213 that is close to the main wing 2 is formed as an inclined surface that approaches the base plate 111 from the leading edge side to the trailing edge side.

Next, the operation of the wing 201, having the above-described structure, will be described.

When aircraft provided with the wing 201 is about to land or take off, the slat 3 is extended in order to realize the aerodynamic characteristics required at the time of landing or takeoff.

At the same time, the seal part 112 that was elastically deformed restores its original shape.

On the other hand, an airflow separated from the lower surface of the slat main body 4 collides against the shock absorbing part 213, and the energy of the airflow is absorbed by the shock absorbing part 213.

When the aircraft provided with the wing 201 is in the cruising state, the slat 3 is retracted into the main wing 2.

At this time, the seal part 112 and the shock absorbing part 213 of the airflow control part 206 are brought into contact with the main wing 2. The seal part 112 is pressed and deformed by the main wing 2 and the slat main body 4. On the other hand, the shock absorbing part 213 is also pressed and deformed by the main wing 2. Therefore, interference between the airflow control part 206 and the leading edge and upper surface of the main wing 2 can be avoided.

According to the above-described structure, when the slat main body 4 is extended from the main wing 2, an air (shear layer) separated from the lower surface of the slat main body 4 flows between the slat main body 4 and the main wing 2, collides against the shock absorbing part 213, and flows along the shock absorbing part 213 and the surface of the cove 5.

When the separated air collides against the shock absorbing part 213, the shock absorbing part 213 absorbs part of the energy of the airflow. Therefore, it is possible to reduce the aerodynamic noise generated by the airflow after it collides against the shock absorbing part 213.

The invention claimed is:

1. A high-lift device comprising:
    a slat main body that is disposed so as to be able to extend from and retract into a main wing, the slat main body including:
        a leading edge that is disposed at an air upstream end of the slat main body;
        a lower surface that extends smoothly from the leading edge of the slat main body;
        an upper surface that extends smoothly from the leading edge of the slat main body, the upper surface projecting further from the leading edge than the lower surface; and
        a concave part that faces the main wing and is able to accommodate at least a part of a leading edge of the main wing; and
    an airflow control part that is disposed at an area of the concave part adjacent to a rear side of the upper surface of the slat main body, the airflow control part being accommodated between the main wing and the concave part when the slat main body is retracted into the main wing, and the airflow control part suppressing turbulence colliding against the area of the concave part adjacent to the rear side of the upper surface of the slat main body when the slat main body is extended from the main wing,
    wherein the airflow control part comprises a plate that is provided at the area of the concave part adjacent to the rear side of the upper surface of the slat main body,
    wherein the plate has a pivotal end and another end, the pivotal end being located closer to the main wing than the another end, the pivotal end being pivotably supported at the slat main body, and the plate having an angle that is adjustable with respect to a central axis of the slat main body, and
    wherein the another end of the plate is positioned so as to not interfere with the leading edge of the main wing and so as to not to impair aerodynamic characteristics when the slat main body is retracted into the main wing, and the another end of the plate is moved downward with respect to the central axis of the slat main body when the slat main body is extended from the main wing.

2. A high-lift device according to claim 1, further comprising a seal part that is provided at the area of the concave part adjacent to the rear side of the upper surface of the slat main body, the seal part extending in a direction away from the upper surface of the slat main body and being deformed when the slat main body is retracted into the main wing, wherein the another end of the plate is supported by the seal part.

3. A high-lift device according to claim 1, wherein the plate is made of an elastic material.

4. A high-lift device according to claim 1, further comprising a lower-surface plate having an inner surface and an outer surface, the lower-surface plate extending toward the main wing from an edge line at which the lower surface of the slat main body and the concave part meet, and the lower-surface plate having an angle that is adjustable with respect to the central axis of the slat main body.

5. A high-lift device according to claim 4, wherein
    the lower-surface plate has an end that is pivotably supported at the edge line on the slat main body, and
    the lower-surface plate has another end that is positioned so as to not interfere with the leading edge of the main wing and so as to not impair aerodynamic characteristics when the slat main body is retracted into the main wing, and the another end of the lower-surface plate moves upward or downward with respect to the central axis of the slat main body when the slat main body is extended from the main wing.

6. A high-lift device according to claim 4, wherein the lower-surface plate comprises a member through which air cannot flow, a member through which a portion of the air can flow, a member having serrations at a trailing edge thereof, or a combination thereof.

7. A wing comprising:
    a main wing; and
    a high-lift device according to claim 1 that is disposed so as to be able to extend from and retract into a leading edge of the main wing.

8. A high-lift device comprising:
    a slat main body that is disposed so as to be able to extend from and retract into a main wing, the slat main body including:
        a leading edge that is disposed at an air upstream end of the slat main body;
        a lower surface that extends smoothly from the leading edge of the slat main body;
        an upper surface that extends smoothly from the leading edge of the slat main body, the upper surface projecting further from the leading edge than the lower surface; and
        a concave part that faces the main wing and is able to accommodate at least a part of a leading edge of the main wing; and
    an airflow control part that is disposed at an area of the concave part adjacent to a rear side of the upper surface of the slat main body, the airflow control part being accommodated between the main wing and the concave part when the slat main body is retracted into the main wing, and the airflow control part suppressing turbulence colliding against the area of the concave part adjacent to the rear side of the upper surface of the slat main body when the slat main body is extended from the main wing,
    wherein the airflow control part comprises
    a base plate that extends along the area of the concave part adjacent to the rear side of the upper surface of the slat main body, and that fixes the airflow control part to the slat main body, and
    a shock absorbing part that is formed of a plurality of fibers extending from the base plate toward the main wing,
    wherein the shock absorbing part absorbs a part of energy from air flowing toward the area of the concave part adjacent to the rear side of the upper surface of the slat main body.

9. A wing comprising:
    a main wing; and
    a high-lift device according to claim 8 that is disposed so as to be able to extend from and retract into a leading edge of the main wing.

10. A noise reduction structure for a high-lift device, the noise reduction structure comprising:
    an airflow control plate that is accommodated between a main wing and a concave part of a slat main body at a location facing the main wing, the concave part being able to accommodate at least a part of a leading edge of the main wing when the slat main body, which is disposed so as to be able to extend from and retract into the main wing, is retracted into the main wing, wherein the airflow control plate is disposed at an area of the concave part adjacent to a rear side of an upper surface of the slat main body, the upper surface projecting away from a leading edge of the slat main body, and wherein the airflow control plate suppresses turbulence colliding against the area of the concave part adjacent to the rear side of the upper surface of the slat main body when the slat main body is extended from the main wing.

11. A high-lift device comprising:

a slat main body that is disposed so as to be able to extend from and retract into a main wing, the slat main body including:

a leading edge that is disposed at an air upstream end of the slat main body;

a lower surface that extends smoothly from the leading edge of the slat main body;

an upper surface that extends smoothly from the leading edge of the slat main body, the upper surface projecting further from the leading edge than the lower surface; and a concave part that faces the main wing and is able to accommodate at least a part of a leading edge of the main wing; and an airflow control part that is disposed at an area on the concave part adjacent to a rear side of the upper surface of the slat main body, the airflow control part being accommodated between the main wing and the concave part when the slat main body is retracted into the main wing, and the airflow control part suppressing turbulence colliding against the area of the concave part adjacent to the rear side of the upper surface of the slat main body when the slat main body is extended from the main wing, wherein the airflow control part comprises a shock absorbing plate that absorbs a part of energy from air flowing toward the area of the concave part adjacent to the rear side of the upper surface of the slat main body.

* * * * *